Nov. 20, 1945.   A. J. HUCK   2,389,434
TIMER FOR TOASTERS AND THE LIKE
Filed Dec. 31, 1942   2 Sheets-Sheet 1
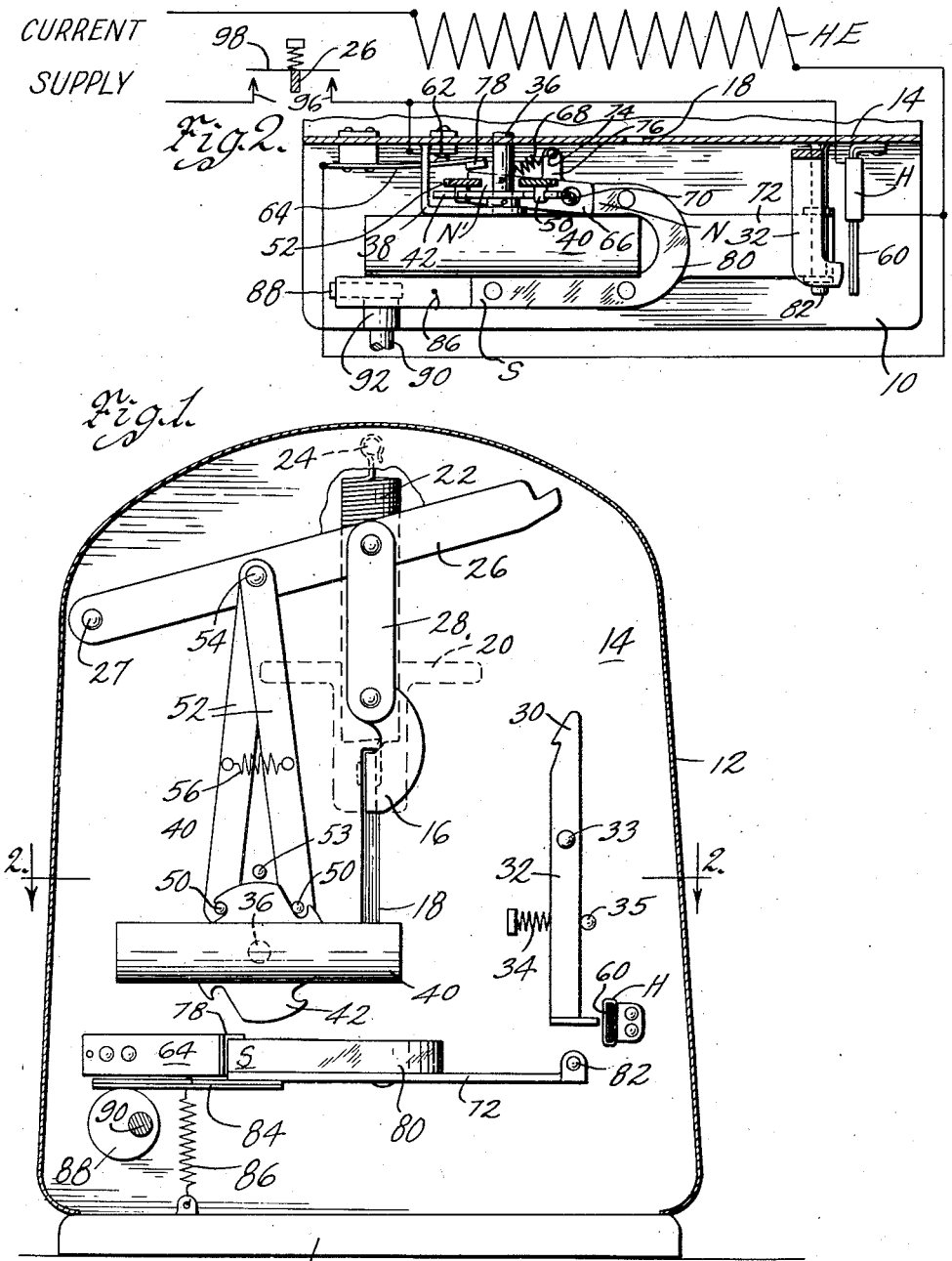
Inventor
Alfred J. Huck
by Bair & Freeman
Attys.

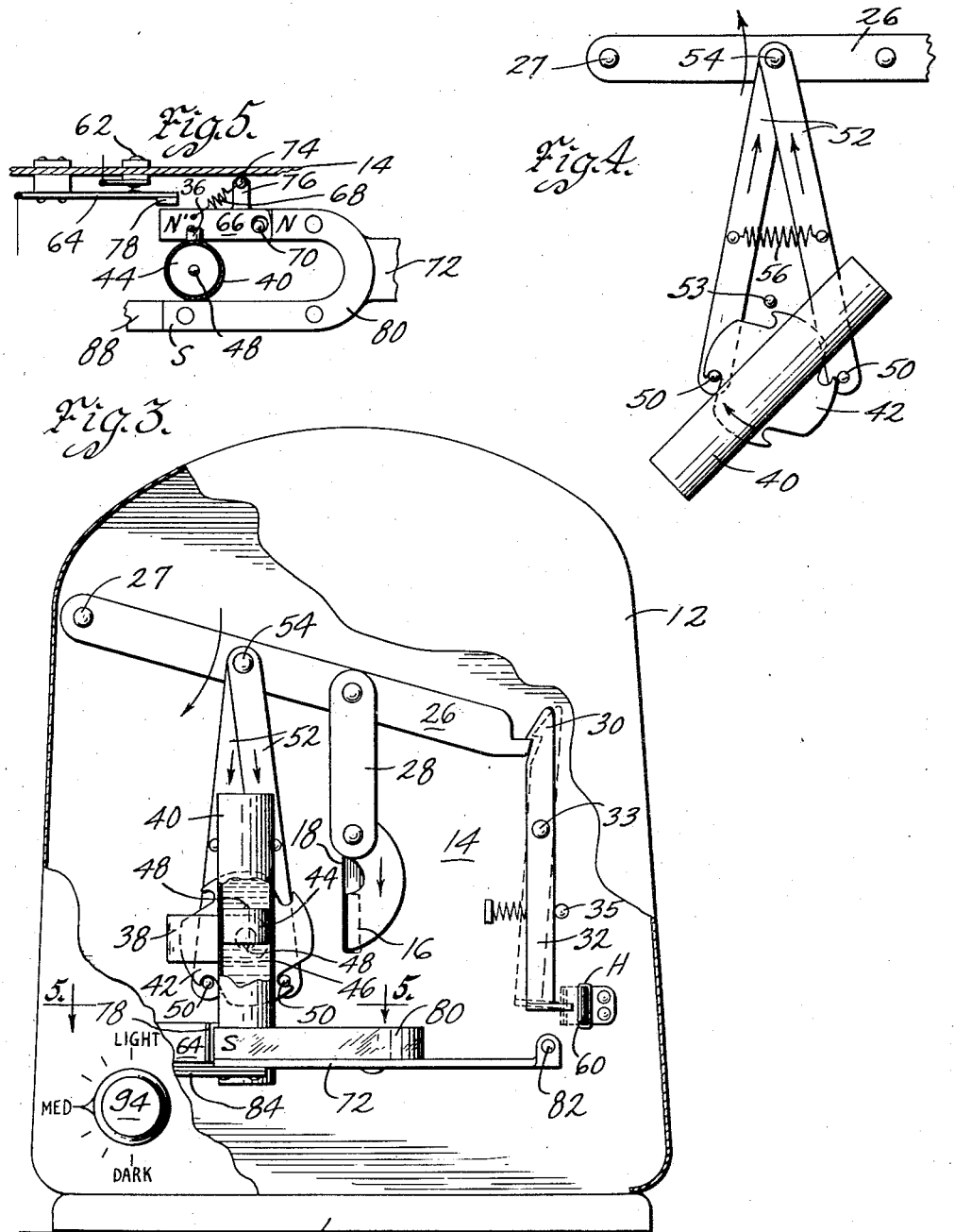

Patented Nov. 20, 1945

2,389,434

UNITED STATES PATENT OFFICE 2,389,434

TIMER FOR TOASTERS AND THE LIKE

Alfred J. Huck, St. Louis, Mo., assignor to Knapp-Monarch Company, St. Louis, Mo., a corporation of Missouri Application December 31, 1942, Serial No. 470,882

17 Claims. (Cl. 161—1)

My present invention relates to a timing mechanism for bread toasters and the like, wherein a dash pot is used to secure the timing cycle.

One object of the invention is to provide a dash pot type of timer for a toaster or other electrical apparatus that is energized by electric current as through a heating element thereof, the dash pot including a liquid to retard the movement of a plunger, whereby the rise in temperature of the appliance reduces the viscosity of the liquid in the dash pot and thereby permits the plunger to operate faster as the appliance is heated up, thus obtaining substantially equal toasting of successive slices of bread or the like.

Another object is to provide a simple means for utilizing the movement of a plunger in a hermetically sealed dash pot to terminate a timing cycle, the plunger being associated with an external magnet and armature and adapted to reduce the air gap between them to thereby move the armature at the completion of the timing cycle.

Still another object is to provide an auxiliary switch controlled by the armature for energizing a latch releasing mechanism for a bread holder and main switch operating mechanism, the magnet and armature being floatingly mounted and movable to different positions to secure color control for the toast.

A further object is to provide a hermetically sealed dash pot timer, wherein the plunger is reversed in direction for successive cycles and is provided with projections to prevent it from sticking to the ends of a tube in which it is mounted.

Still a further object is to provide compensating means, such as a bimetal element, for any variation in the viscosity-temperature characteristics of the liquid from a desirable characteristic that secures exact compensation, the bimetal element compensating for either over or under compensation as necessary.

With these and other objects in view, my invention consists in the construction, arrangement and combination of the various parts of my timer for toasters and the like, whereby the objects contemplated are attained, as hereinafter more fully set forth, pointed out in my claims, and illustrated in the accompanying drawings, in which:

Figure 1 is a vertical, sectional view through a bread toaster or the like, the section being taken through an end compartment of the toaster, beyond the heating element compartment thereof.

Figure 2 is a sectional view on the line 2—2 of Figure 1 with the casing omitted, and showing electro-diagrammatically the heating element of the toaster, a main switch for the heating element and an auxiliary switch and warp element heater of my timing mechanism.

Figure 3 is a view similar to Figure 1 showing a bread holder in lowered, rather than raised position.

Figure 4 is a view of a portion of Figure 1, showing the dash pot of my timing mechanism in an intermediate position; and Figure 5 is a sectional view on the line 5—5 of Figure 3 showing an auxiliary switch of my timing mechanism moved to the position it assumes as a result of the dash pot assuming a timing period terminating position and thereby actuating the auxiliary switch.

On the accompanying drawings, I have used the reference numeral 10 to indicate a base and 12 a casing of an electrical bread toaster. Upstanding from the base 10 is an end plate 14 and beyond this end plate is a toasting chamber (not shown) containing a heating element HE, shown diagrammatically in Figure 2.

In the toasting chamber is a bread carrier bar 16, which extends through a vertical slot 18 in the end plate 14 and is provided on its far end with an operating handle 20. The bar 16 is biased to raised position by a spring 22 at the far end of the toaster, having its upper end anchored as to a stationary pin 24. I have not shown the details of the bread carrier bar 16, nor other features of the toaster, which may be similar to those shown in my co-pending application, Serial No. 418,455 filed November 10, 1941.

A latch arm 26 is pivoted at 27 and connected by a link 28 with the bread carrier bar 16. When the handle 20 is depressed, the spring 22 is stretched and the free end of the latch arm 26 finally is latched under a hook 30 of a latch lever 32 pivoted at 33. A spring 34 tends to move the latch lever 32 in the proper direction for latching thereof and the lever is limited in its movement by a stop 35.

A shaft 36 is journaled in the end plate 14 and in a bracket 38, and has mounted thereon a tube 40 and a notched disc 42. The tube 40 is part of a dash pot and has closed ends, the tube being hermetically sealed with a plunger 44 and liquid 46 therein. The tube 40 is made of brass or the like, whereas the plunger 44 is made of soft iron or other magnetic material, which is readily demagnetized when moved away from the vicinity of a magnet. The plunger 44 has a pair of points 48 on its ends designed to prevent "plate against plate" contact of the plunger 44 with the ends of the tube 40.

The notched disc 42 has cooperable therewith a pair of pins 50 carried by links 52. The links 52 are pivoted to the latch arm 26 at 54 and are constrained toward each other by a spring 56. A stop pin 53 is arranged between the links to prevent excessive movement thereof toward each other.

For actuating the latch lever 32 against the action of the spring 34, I provide a bimetal element 60 having thereon a heater H. For energizing the heater H, I provide a shunting switch consisting of a stationary contact 62 and a leaf spring contact 64. The contact 64 is normally held engaged with the contact 62 by an armature 66 and a spring 68. The armature 66 is loosely pivoted on a pin 70 projecting upwardly from a mounting plate 72, the spring 68 having one end connected to the armature and its other end connected to a pin 74 extending upwardly from an extension 76 of the plate 72.

The angle of the spring 68 is such that it holds the armature against an insulating button 78 of the leaf spring 64 and the right hand end of the armature 66 against one pole of a permanent magnet 80. The other pole of the permanent magnet is adjacent the tube 40 and for convenience these poles are marked N and S respectively. The pole N magnetizes the armature 66, so that it has a pole N', which is adjacent the tube 40 and on the opposite side from the pole S.

The plate 72 is pivoted to a pin 82 and has a bimetal element 84 secured thereto. The bimetal element 84 is held by a spring 86 against an adjusting cam 88 on a shaft 90. The shaft 90 extends through a bearing 92 to a color control knob 94 on the outside of the casing 12.

In Figure 2, I have shown a main switch, comprising a pair of contacts 96 and a shunting contact 98. The bridging contact 98 is biased to normally engage the contacts 96 and is adapted to be separated therefrom by the latch arm 26 engaging the shunting contact and raising it to the position shown in Figure 2.

For more detailed description of a switch of this character, you are referred to my copending application, Serial No. 465,361, filed November 12, 1942, now Patent No. 2,362,752.

The wiring shown in Figure 2 illustrates the auxiliary switch 62—64 as shunting the heater H, the heater and auxiliary switch being in series with the heating element HE.

*Practical operation*

In the operation of my timing mechanism, assuming the parts first in the position of Figure 1, it will be noted that the tube 40 is horizontal. As the handle 20 is manually moved downward for lowering the bread carrier bar 16 and the bread into the toaster for toasting, the latch arm 26 during lowering will effect clockwise rotation of the notched disc 42 from the position of Figure 1 to the position of Figure 3, wherein the tube 40 is vertical. The right-hand pin 50 in this instance is the one that effects rotation of the disc, whereas the left-hand pin 50 slides along the periphery of the disc.

In Figure 1, the plunger 44 is adjacent the left-hand end of the tube 40, so that when the tube reaches the position of Figure 3, the plunger is adjacent the top of the tube. It will gradually fall downwardly in the tube, retarded by the liquid 46, and thus provide a timing period, which is terminated by the plunger reaching a position between the magnet pole S and the armature pole N'.

The magnetic or air gap between the poles is then reduced so that the armature is attracted toward the pole S, the magnetic lines, of course, passing through and being readily conducted by the plunger, and thereby overcoming the tension of the spring 68 for moving the armature to the position shown in Figure 5. This results in opening the auxiliary switch, so that the current normally shunted from the heater H, now flows through the heater for warping the bimetal element 60 to the dotted position of Figure 3. This releases the latch lever 32 from the latch arm 26 as shown by dotted lines, whereupon the spring 22 raises the latch arm, thereby moving the bread up to a non-toasting position to indicate completion of the toasting cycle.

At the same time, the latch arm 26 engages the bridging contact 98 of the main switch to move it to the open position of Figure 2, thereby cutting off all current flow to the toaster and to the timing mechanism.

In Figure 4, I show how during the raising of the latch arm 26 by the spring 22, the left-hand pin 50 is the one that actuates the notched disc 42, the right-hand pin passing over the periphery of the disc until the position of Figure 1 is again reached. Thus the rotation of the disc 42 is always a quarter-turn clockwise with each depression of the bread carrier, and is likewise a quarter-turn clockwise each time the bread carrier rises. The result is positioning of the dash pot tube 40 in the horizontal position of Figure 1 when the toaster is at rest, so that the plunger 44 starts from whatever position it assumed at the completion of the previous cycle. Otherwise the second cycle might be started too long after the first cycle and after the plunger had reached the bottom of the tube.

Thus I am assured of equal toasting periods regardless of how closely one cycle follows another, taking into consideration, of course, compensating features, which will hereinafter be described.

Due to the dash pot timer having liquid 46 therein, I secure compensation for ambient temperature rise because at the same time, the viscosity of the liquid decreases. Thus the successive cycles are shorter to produce substantially equal toasting of successive slices of bread. Preferably a liquid having the desired viscosity-temperature characteristic is selected, but where this is not feasible, compensation can be secured by use of the compensating bimetal 84, whereas if the liquid exactly compensates as desired, this bimetal may be replaced by a non-warping element. The bimetal element 84 is selected to have the desired characteristic for either over-compensation or under-compensation as necessary, and required due to the particular liquid 46 being used, the arrangement being such that the high expansion side is uppermost if positive compensation or shortened periods are desired, whereas the high expansion side is arranged lowermost, if negative compensation or lengthened periods is desired.

The foregoing description makes it obvious that a timing mechanism of the dash pot type can be applied to a toaster or other electrical appliance and will have a compensating characteristic for temperature rise. Additional means is also adaptable for either reducing the compensation or increasing it as necessary, and an arrangement has been shown, whereby the dash pot effects operation of an auxiliary switch through a permanent magnet and armature means of actuating the switch, so that a hermetically sealed dash pot can be utilized. The auxiliary switch effects operation of a releasing means for a bread carrier or the like and effects automatic opening of the circuit of the appliance at the completion of the timing period.

Some changes may be made in the arrangement and construction of the various parts of my timer for toasters and the like, without departing from the real spirit and purposes of my invention, and it is my intention to cover by my claims, any modified forms of structure or use of mechanical equivalents, which may be reasonably included within their scope.

I claim as my invention:

1. Timing mechanism for an electrical appliance comprising a dash pot, means for inverting said dash pot and closing the main switch for said electrical appliance, a latch for said last means, electrically operated means for releasing said latch, and contacts for controlling said electrically operated means when the movable member of said dash pot reaches a predetermined position, said contacts being moved to position effecting energization of said electrically operated means when said movable member of said dash pot assumes said predetermined position.

2. Timing mechanism for an electrical bread toaster or the like, comprising a hermetically sealed tube, a ferrous plunger therein and movable by gravity from end to end thereof, liquid in said tube to retard the movement of said plunger, means for inverting said tube and closing the circuit of the heating element of said toaster, a latch for said last means, and means including a magnetized armature attractable by said plunger for effecting release of said latch when the plunger reaches a predetermined position in said tube.

3. In timing mechanism for an electrically heated appliance, a dash pot, liquid therein, a movable magnetic member, means for inverting said dash pot and closing the circuit for said electrical appliance, a latch for said last means, and means including an armature for releasing said latch when said movable member reaches a predetermined position and effects movement of said armature, said liquid having a temperature-viscosity characteristic which compensates for temperature rise of said appliance.

4. In timing mechanism for an electrical bread toaster or the like, a hermetically sealed tube, a plunger therein, and movable by gravity from end to end thereof, liquid in said tube to retard the movement of said plunger, means for positioning said tube vertically and closing the circuit of the heating element of said toaster, a latch for said last means, means for releasing said latch controlled by said plunger when it reaches a predetermined position in said tube, and means controlled by said latch for positioning said tube horizontally.

5. Timing mechanism for an electrical bread toaster or the like having a heating element and a normally closed circuit closer for the circuit thereof, comprising a hermetically sealed tube, a plunger therein, a liquid fill in said tube to retard the movement of said plunger, means for positioning said tube with said plunger adjacent the top thereof and for permitting said circuit closer to close, a latch for said last means, and means controlled by said plunger when it reaches a predetermined position in said tube for releasing said latch, said last means comprising a magnetic armature exterior of said tube and attractable by said plunger when it reaches a position thereadjacent, electrically energizable means for effecting release of said latch, and switching means for the circuit of said electrically energizable means and operable by movement of said armature when it is attracted by said plunger to effect energization of said electrically energizable means.

6. Timing mechanism for an electrical appliance having a heating element and a self closed switch therefor, comprising a liquid filled dash pot, means for inverting said dash pot and permitting said switch to close, a latch for said last means, and a magnetic armature adjacent said dash pot to be attracted by said movable member thereof when it reaches a predetermined position therein, said armature being operatively associated with said latch to effect movement thereof to released position following attraction of said armature by said movable member controlled by the movable member of said dash pot for releasing said latch when said movable member reaches a predetermined position.

7. Timing mechanism for an electrical appliance comprising a dash pot, means for inverting said dash pot and closing the main switch for said electrical appliance, a latch for said means, means for releasing said latch when the movable member of said dash pot reaches a predetermined position, said last means comprising a bimetal element, a heater therefor, an auxiliary switch for effecting energization of said heater to warp said bimetal element to a position for releasing said latch, and means for operating said auxiliary switch comprising an armature, a magnet for magnetically energizing said armature, said armature and magnet being adjacent said dash pot whereby said movable member may pass between the two to thus reduce the magnetic gap from the magnet to the armature and move the armature to operate the auxiliary switch, the viscosity-temperature characteristic of said liquid being such as to compensate for rise in temperature of the appliance, and thereby secure substantially equal operation during successive cycles.

8. In timing mechanism for an electrical appliance, a dash pot, means for positioning said dash pot for movement of its movable element and for closing the circuit for said electrical appliance, means for opening said circuit when said movable element reaches a predetermined position, said last means comprising a bimetal element, a heater therefor, an auxiliary switch for effecting energization of said heater to warp said bimetal element to a position for opening said circuit, and means for operating said auxiliary switch from said dash pot, the viscosity-temperature characteristic of said liquid being such as to compensate for rise in temperature of the appliance and thereby secure substantially equal operation during successive cycles.

9. Timing mechanism for an electrical appliance comprising a tube having a plunger and retarding liquid therein, means for positioning said tube vertically with said plunger adjacent the upper end thereof at the beginning of a timing period, a bimetal element for terminating said timing period, a heater for said bimetal element, a switch for effecting energization of said heater to warp said bimetal element to its timing period terminating position, and means for operating said auxiliary switch comprising an armature, a magnet for magnetically energizing said armature, said armature and magnet being adjacent said tube, whereby said plunger may pass between the two to thus reduce the magnetic gap from the magnet to the armature and move the armature to operate the auxiliary switch, the viscosity-temperature characteristic of said liquid being such as to compensate for rise in temperature of the appliance.

10. Timing mechanism for an electrical bread toaster or the like comprising a hermetically sealed tube, a plunger therein, and movable by gravity from end to end thereof, liquid in said tube to retard movement of said plunger, means for inverting said tube and closing the circuit of the heating element of said toaster, a latch for said last means, and means for releasing said latch controlled by said plunger when it reaches a predetermined position in said tube, said last means comprising a bimetal element, a heater therefor, an auxiliary switch for effecting energization of said heater to warp said bimetal element to a position for releasing said latch, and means for operating said auxiliary switch comprising an armature, a magnet for magnetically energizing said armature, said armature and magnet being adjacent said tube, whereby said plunger may pass between the two to thus reduce the magnetic gap from the magnet to the armature and move the armature to operate the auxiliary switch, the viscosity-temperature characteristic of said liquid being such as to compensate for rise in temperature of the toaster, and thereby secure substantially equal toasting of successive slices of bread.

11. Timing mechanism for an electrical bread toaster or the like comprising a hermetically sealed tube, a plunger therein and movable by gravity from end to end thereof, liquid in said tube to retard movement of said plunger, spring returned means for inverting said tube and closing the circuit of the heating element of said toaster, a latch for said last means to keep it in the position to which it was moved, and means controlled by said plunger when it reaches a predetermined position in said tube for releasing said latch whereby said first means can return to its initial position and open the circuit of the heating element, the viscosity-temperature characteristic of said liquid being such as to compensate for rise in temperature of the toaster, and thereby secure substantially equal toasting of successive slices of bread.

12. Timing mechanism for an electrical appliance comprising a dash pot, means for inverting said dash pot and closing the main switch for said electrical appliance, a latch for said last means, and means for releasing said latch when the movable member of said dash pot reaches a predetermined position, said last means comprising an electrically operated latch releasing device, an auxiliary switch therefor, means for operating said auxiliary switch comprising an armature moved by said plunger when thereadjacent to operate the auxiliary switch.

13. Timing mechanism for an electrical appliance comprising a dash pot, means for inverting said dash pot and closing the main switch for said electrical appliance, a latch for said last means, and means for releasing said latch when the movable member of said dash pot reaches a predetermined position, said last means comprising an electrically operated latch releasing device, an auxiliary switch therefor, means for operating said auxiliary switch comprising an armature, a magnet for magnetically energizing said armature, said armature and magnet being adjacent said dash pot, whereby said movable element therein may pass between the two to thus reduce the magnetic gap between the magnet and the armature and move the armature to operate the auxiliary switch, the viscosity-temperature characteristics of said dash pot being such as to partially compensate for rise in temperature of said electrical appliance, and bimetallic means to further compensate for rise in temperature of the appliance.

14. Timing mechanism for an electrical appliance comprising a dash pot, means for inverting said dash pot and closing the circuit to said electrical appliance, means for opening said circuit when the movable member of said dash pot reaches a predetermined position, said last means comprising an armature, a magnet for magnetically energizing said armature, said armature forming an extension of one pole of said magnet, the other pole of said magnet being adjacent one side of said dash pot and the outer end of said armature being adjacent the opposite side thereof, whereby said movable element therein may pass between the two to thus reduce the magnetic gap between the magnet and the armature and move the armature.

15. In timing mechanism for an electrical appliance having a heating element and a normally closed switch therefor, a dash pot, means for positioning said dash pot for movement of its movable element and for permitting the closing of said switch, a latch for said means, a release device for said latch, a magnetic armature operatively connected with said release device and attractable by said movable element of said dash pot when it reaches a predetermined position, the viscosity-temperature characteristic of the liquid in said dash pot being such as to compensate for rise in temperature of the appliance, and thereby secure substantially equal operation during successive cycles.

16. Timing mechanism for an electrical appliance comprising a dash pot, means for inverting said dash pot and closing the circuit to said electrical appliance, means for opening said circuit when the movable member of said dash pot reaches a predetermined position, said last means comprising a magnet, an armature magnetically energized thereby, said armature forming a continuation of one pole of said magnet, said armature and the other pole of said magnet being adjacent said dash pot and opposite each other whereby said movable element therein may pass between the two to thus reduce the magnetic gap between the magnet and the armature and move the armature, a mounting bracket carrying said armature and said magnet, and means to change the position of said bracket relative to said dash pot to change the timing period.

17. In a timing mechanism for an electrical appliance, a rotatable shaft, pawl and ratchet means for rotating said shaft, a latch for the pawl of said pawl and ratchet means, a hermetically sealed tube carried by said shaft and arranged transversely thereof to assume a vertical position when said pawl is moved to an operating position and a horizontal position when said pawl is returned to an inoperative position, spring means for returning said pawl to said inoperative position, a plunger movable in said tube, liquid in the tube for retarding the motion of the plunger, a movable magnetized armature positioned adjacent said tube whereby a magnetic gap is provided between said armature and the interior of said tube, said armature being adapted to be moved by attraction between said armature and said plunger due to a reduction in said magnetic gap between them when said plunger lowers by gravity to a position adjacent said armature, said armature upon such movement unlatching said pawl to permit the same to move to said inoperative position.

ALFRED J. HUCK.